United States Patent [19]
Vinel et al.

[11] Patent Number: 5,436,748
[45] Date of Patent: Jul. 25, 1995

[54] AUTOMATICALLY CONFIGURABLE OPTICAL SYSTEM FOR CONNECTING CUSTOMER PREMISES NETWORKS TO A SWITCHING CENTER OF A TELECOMMUNCATION NETWORK

[75] Inventors: Paul Vinel, Velizy; Philippe Perrier, Paris, both of France

[73] Assignee: Societe Anonyme Dite: Alcatel Cit, Paris, France

[21] Appl. No.: 53,566

[22] Filed: Apr. 28, 1993

[30] Foreign Application Priority Data

Apr. 30, 1992 [FR] France .................. 92 05400

[51] Int. Cl.⁶ ............................................. H04J 14/02
[52] U.S. Cl. ..................................... 359/125; 359/167; 359/118; 359/128
[58] Field of Search ............... 359/117, 118, 120, 121, 359/124, 125, 128, 173, 167, 165

[56] References Cited

U.S. PATENT DOCUMENTS

| | | | |
|---|---|---|---|
| 4,592,043 | 5/1986 | Williams | 359/126 |
| 4,730,301 | 3/1988 | McMahon | 359/124 |
| 4,768,188 | 8/1988 | Barnhart et al. | |
| 5,093,743 | 5/1992 | Eng et al. | 359/117 |
| 5,221,983 | 6/1993 | Wagner | 359/125 |
| 5,319,485 | 6/1994 | Yasui et al. | 359/128 |
| 5,321,540 | 6/1994 | Takai et al. | 359/125 |

OTHER PUBLICATIONS

Proceedings of the International Switching Symposium, 28 MEI-1 Jun. 1990, vol. 1, pp. 147-152, Stockholm, Sweden, XP130835, A. Fioretti et al: "A Novel Distributed Photonic Switch".
Proceedings Of The International Symposium On Subscriber Loops and Services, Sep. 29-Oct. 3, 1986, pp. 187-192, Tokyo, Japan, pp. 187-192, XP67758, K. Murano et al: "A Flexible and Autonomous Network Configuration for Broadband Subscriber Loop Transmission".

Primary Examiner—David K. Moore
Assistant Examiner—Rafael Bacares
Attorney, Agent, or Firm—Sughrue, Mion, Zinn, Macpeak & Seas

[57] ABSTRACT

An automatically configurable optical connection system for connecting customer premises networks to a switching center of a telecommunication network includes an optical distribution network connecting all central office termination equipment optical senders to all customer premises network optical receivers and connecting all customer premises network optical senders to all central office termination equipment optical receivers. A control unit assigns a different wavelength to each customer premises network communicating at a given time, this wavelength representing an available central office termination equipment which is not the control central office termination equipment. To enable automatic system configuration each central office termination equipment sends cyclically an identification message and each inactive customer premises network listens out cyclically at each wavelength available to the central office termination equipments and memorizes the relationship between the wavelengths and the central office termination equipment identities, marking the control central office termination equipment wavelength. The system is for use in broadband telecommunication networks.

3 Claims, 8 Drawing Sheets

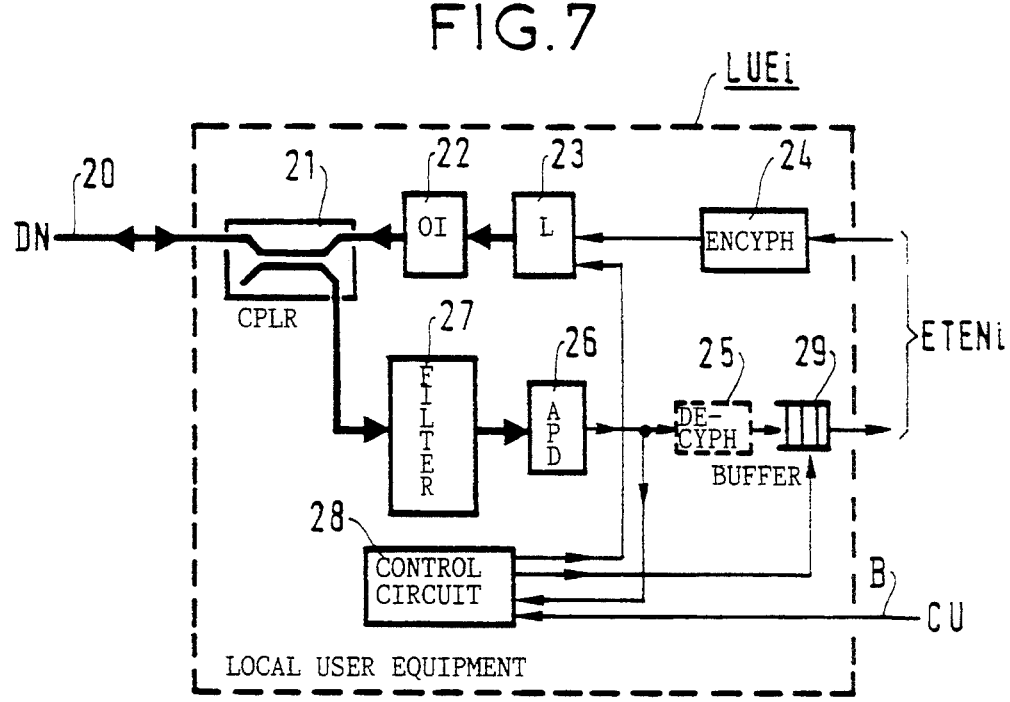
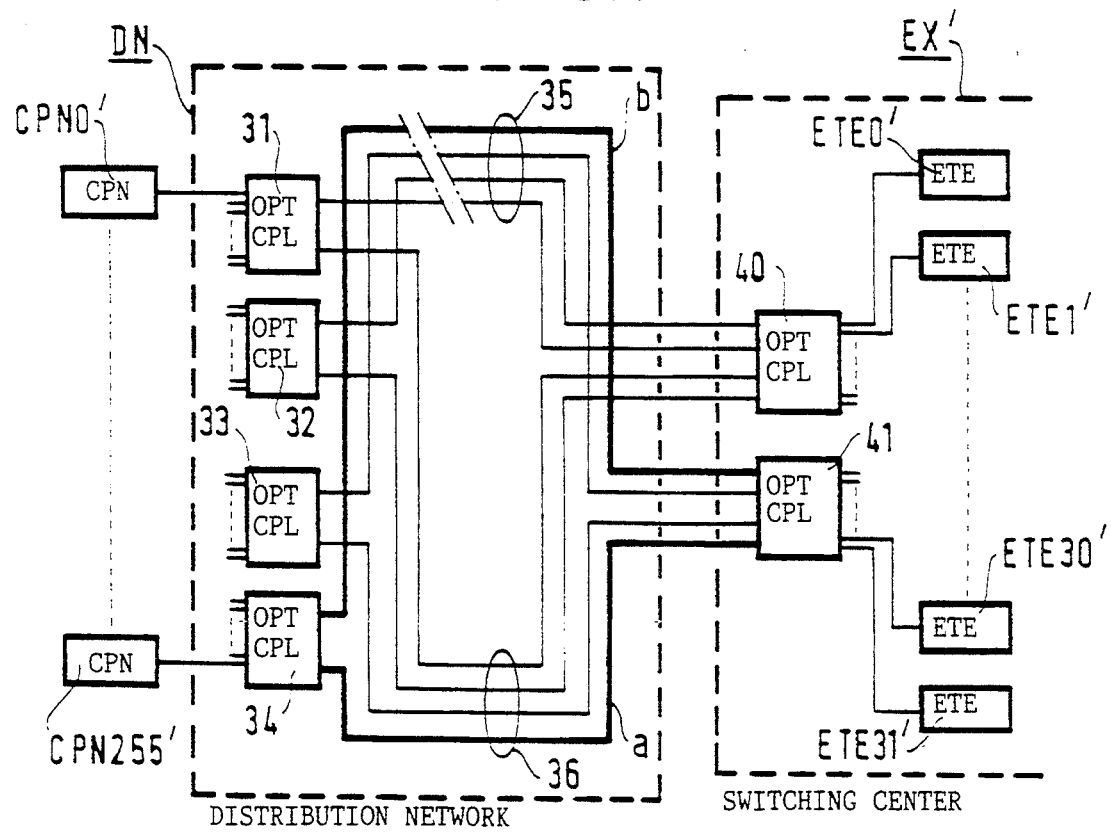

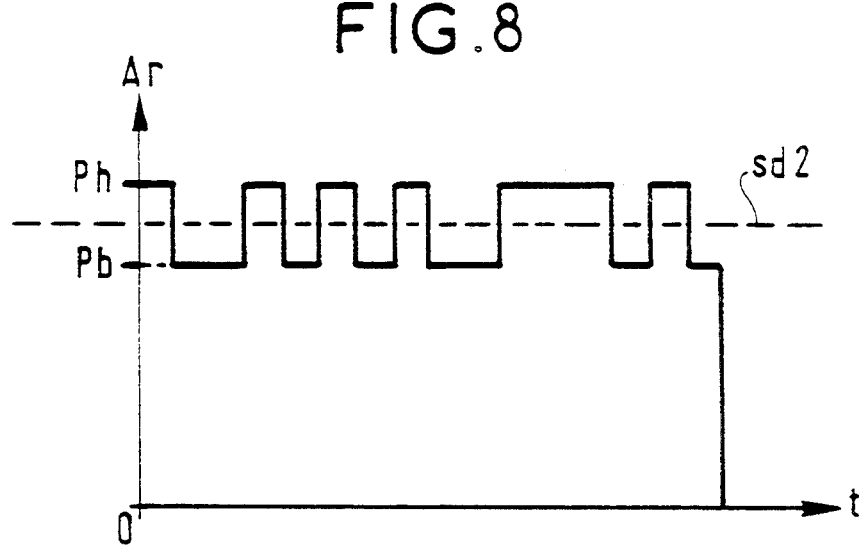
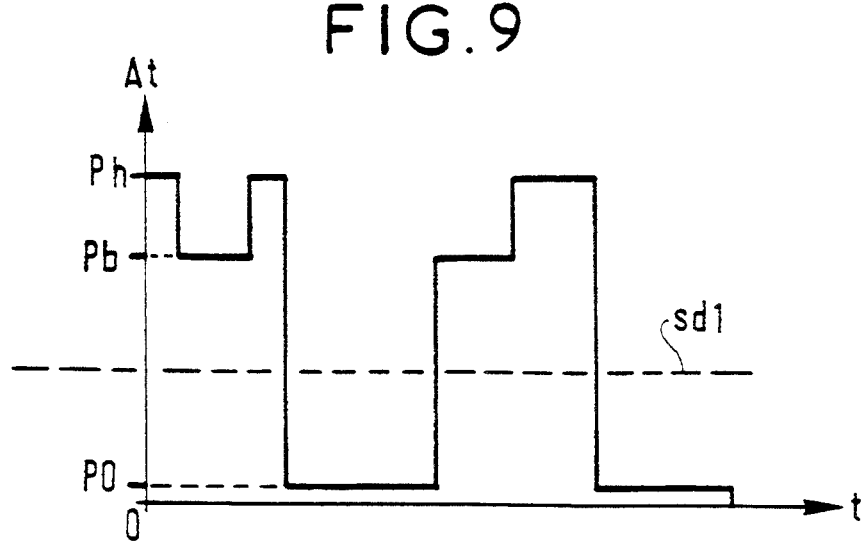

AUTOMATICALLY CONFIGURABLE OPTICAL SYSTEM FOR CONNECTING CUSTOMER PREMISES NETWORKS TO A SWITCHING CENTER OF A TELECOMMUNCATION NETWORK

BACKGROUND OF THE INVENTION

1. Field of the invention

The invention concerns an automatically configurable optical system for connecting customer premises networks to a switching center of a telecommunication network. An optical system of this kind comprises an optical distribution network comprising optical fibers coupled to equipments called central office termination equipments in the switching center and coupled to the customer premises networks. The switching center and the telecommunication network are broadband systems. Copper cables are ill suited to transmission of data at high bit rates which is why optical fibers are used to connect the customer premises networks to the switching center. To facilitate the adoption of a connection system of this kind it is necessary to minimize the cost of implementing each customer premises network and to ensure that services are extremely reliable.

2. Description of the prior art

French patent application n° 91 12 264 describes an optical connection system in which each central office termination equipment comprises an optical sender and an optical receiver operating at the same fixed wavelength. Each central office termination equipment uses a different wavelength. Each customer premises network comprises an optical sender and an optical receiver which can be tuned to different wavelengths. A wavelength is assigned to a customer premises network by a control unit in the switching center at the time each call is set up between the customer premises network and a central office termination equipment. The number of customer premises networks is very much larger than the number of central office termination equipments to which they are connected because not all customer premises networks make or receive calls simultaneously. Dynamic assignment of wavelengths to customer premises networks means that the same wavelength can be used again for different customer premises networks setting up non-simultaneous calls.

A group of customer premises networks is connected to a group of central office termination equipments by a distribution network which broadcasts an optical signal sent by any sender of the connection system to each optical receiver of the connection system. A switching center may comprise a plurality of identical connection systems each comprising a group of central office termination equipments connected to a group of customer premises networks by independent broadcast networks so that a common set of wavelengths can be re-used several times.

A control central office termination equipment in each group of central office termination equipments sets up calls. When a customer premises network goes active, it sends a message using the control central office termination equipment wavelength. The control central office termination equipment sends the message to the control means of the switching center. The control means tell the control central office termination equipment the identity of a central office termination equipment available to set up a call. The control central office termination equipment sends a message to the customer premises network using the control central office termination equipment wavelength. This message tells the customer premises network the identity of the available central office termination equipment. The customer premises network deduces from this the wavelength at which it must send and receive to use the central office termination equipment assigned to the call. This wavelength is assigned to this customer premises network for the entire duration of this call, and for this duration only.

In order to function a customer premises network needs to know the control central office termination equipment wavelength and the relationship between the identities indicated in the messages sent by the control central office termination equipment and the wavelengths. In this prior art system a customer premises network can know this information only if it is provided when it is installed. For example, it is feasible to program this information manually into the customer premises network by means of small switches or by plugging in a read-only memory module. This type of method has the drawback of requiring a certain amount of work each time that a customer premises network is installed and lacks flexibility because it is not possible to replace a faulty central office termination equipment with another central office termination equipment having another wavelength without doing the same work over at all customer premises networks. In particular, it is not possible to assign the control central office termination equipment function to any of the central office termination equipments installed in the switching center. If a central office termination equipment fails it must be replaced with another central office termination equipment having the same wavelength. Consequently, either a large number of central office termination equipments having predetermined wavelengths must be kept in reserve or a single central office termination equipment must be kept in reserve having a wavelength which is set when it is put into service.

An object of the invention is to propose a connection system that is configurable and reconfigurable automatically to avoid the need for work on each customer premises network when the latter is installed and to minimize the disturbance to services in the case of a fault in a central office termination equipment or in the distribution network.

SUMMARY OF THE INVENTION

The invention consists in an automatically configurable optical connection system for connecting customer premises networks to a switching center of a telecommunication network, said switching center comprising a connection network, a connection network control unit and central office termination equipments, each central office termination equipment comprising an optical sender and an optical receiver tuned to the same wavelength, different for each central office termination equipment, each customer premises network comprising an optical sender and an optical receiver tuned to the same wavelength which is variable, the wavelength of the receiver being set to the wavelength of a control central office termination equipment when the customer premises network is not communicating, the system comprising:

an optical distribution network connecting all central office termination equipment optical senders to all customer premises network optical receivers and connecting all customer premises network optical senders to all central office termination equipment optical receivers, and a control unit for assigning a different wavelength to each customer premises network communicating at a given time, said wavelength representing an available central office termination equipment which is not the control central office termination equipment, in which system:

each central office termination equipment comprises means for assigning to said central office termination equipment an identity and means for commanding the optical sender of said central office termination equipment to send cyclically an identification message containing the identity of said central office termination equipment and indicating if the control central office termination equipment function is assigned to it or not, each customer premises network comprises means for, when said customer premises network is inactive:

tuning its receiver successively to each of the wavelengths available to the central office termination equipments, waiting at each wavelength for a predetermined time to receive an identification message, memorizing the central office termination equipment identity for each wavelength on which the customer premises network has received an identification message, marking the identity of each control central office termination equipment among the memorized identities, and tuning its receiver to the wavelength of a control central office termination equipment.

With this system, when each customer premises network is put into service it automatically determines the system configuration, i.e. it automatically establishes a relationship between the various wavelengths that it may receive and the various central office termination equipment identities that may be mentioned in messages sent by the control central office termination equipment to set up calls. This system enables the customer premises network to distinguish automatically the wavelength of the control central office termination equipment, on which each customer premises network must "listen out" when it is inactive (on standby). Because this information can be updated cyclically, the customer premises networks can be advised very quickly of changes in the functions assigned to the various central office termination equipments to remedy failure of one central office termination equipment or a part of the optical distribution network. These function changes may be manual or the result of an automatic test and reconfiguration procedure.

According to another feature of the system in accordance with the invention, the switching center comprises means for:

assigning the control central office termination equipment function to at least one central office termination equipment operating correctly, monitoring the operation of each central office termination equipment, and assigning the control central office termination equipment function to a different central office termination equipment operating correctly if the previous control central office termination equipment fails.

This system enables the set of central office termination equipments to be reconfigured automatically should any of them fail because the switching center includes means for assigning the control central office termination equipment function to any other central office termination equipment and because each customer premises network can take note of this change of control central office termination equipment automatically.

According to another feature the optical distribution network of the system in accordance with the invention comprises:

at least a first stage of optical couplers connected to said central office termination equipments, at least a second stage of optical couplers connected to said customer premises networks, and fibers connecting said first stage couplers to said second stage couplers, at least two optical fibers linking each second stage coupler to at least one first stage coupler, using different paths, so that failure of either optical fiber does not prevent any customer premises network from being connected to at least one central office termination equipment.

This system is particularly reliable because it enables at least some telecommunication services accessible to a subscriber to be maintained if a failure occurs between the two stages of the optical distribution network, i.e. on the optical cables connecting the switching center to a central office termination equipment serving a small group of customer premises networks.

The invention will be better understood and other details of the invention will emerge from the following description and the accompanying drawings.

BRIEF DESCRIPTION OF THE DRAWINGS

FIG. 7 is a block diagram of one embodiment of the central office termination equipment adapted to be connected to the customer premises network shown in FIG. 5.

FIGS. 8 and 9 are timing diagrams showing the exchange of data between the customer premises network and the central office termination equipment.

FIG. 10 is a block diagram of one embodiment of a broadcast network adapted to limit the effects of a transmission cable being cut in one embodiment of the system in accordance with the invention.

DETAILED DESCRIPTION OF THE INVENTION

Figure 1:
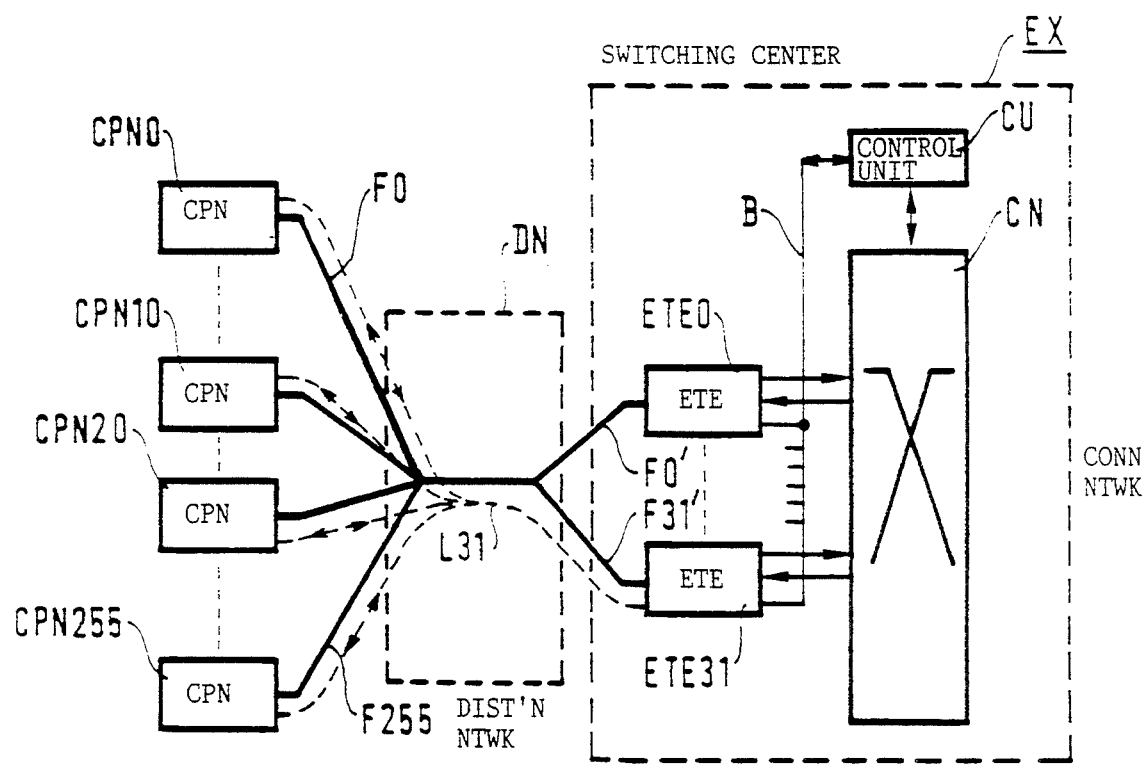
FIG. 1 is a block diagram of one embodiment of a connection system in accordance with the invention.

FIG. 1 shows one embodiment of a connection system in accordance with the invention comprising a group of 256 customer premises networks CPN0 through CPN255 connected by an optical distribution network DN to a switching center EX which is part of a broadband asynchronous transfer mode telecommunication network. The number of customer premises networks (256) is chosen purely by way of example. The total number may be higher. The upper limit is set by the capabilities of the optical transmission technology. Each customer premises network CPN0 through CPN255 has an optical input-output connected by a single optical fiber F0 through F255 to the distribution network DN which in the block diagram is shown as a single optical fiber. The switching center EX comprises a connection network CN and 32 central office termination equipments ETE0 through ETE31. Each central office termination equipment has an optical input-output connected by a single optical fiber F'0 through F'31 to the distribution network DN, an electrical input and an electrical output respectively connected to an electrical output and an electrical input of the connection network CN. The switching center EX further comprises a control unit CU connected by a link B to each central office termination equipment ETE0 through ETE31 and connected to an input-output of the connection network CN.

The control central office termination equipment function is assigned to one of the 32 central office termination equipments (central office termination equipment ETE0, for example) by the control unit CU. This assignment can be reconsidered if the control unit CU detects that the chosen central office termination equipment is no longer operating correctly.

The control unit CU monitors the operation of each central office termination equipment ETE0 through ETE31 continuously, verifying that each call assigned to a central office termination equipment is processed correctly and that the control central office termination equipment is capable of sending and receiving messages. If a central office termination equipment fails it is no longer used and its functions are assigned to another central office termination equipment. This other central office termination equipment may be a standby central office termination equipment which is installed but which is not usually used. A standby central office termination equipment may be provided for each group of 32 central office termination equipments, for example. If the control central office termination equipment fails the fault is particularly serious because it is no longer possible to set up a call between a customer premises network and any other central office termination equipment.

However, the control unit CU can rectify this fault immediately by assigning the control central office termination equipment function to another central office termination equipment that is operating correctly: all the central office termination equipments are identical apart from their different, fixed wavelengths.

They comprise all the control means they need to implement either the control central office termination equipment function or the call central office termination equipment function, as assigned by the control unit. When the control central office termination equipment is replaced with another, all customer premises networks must change the wavelength on which they "listen out" when on standby to receive calls and on which they request call set-up. Similarly, when a customer premises network has just been created it begins by determining the configuration of the connection system, i.e. the relationship between the 32 wavelengths that its receiver may receive and the numbers identifying the central office termination equipments with which it can communicate.

Figure 2:
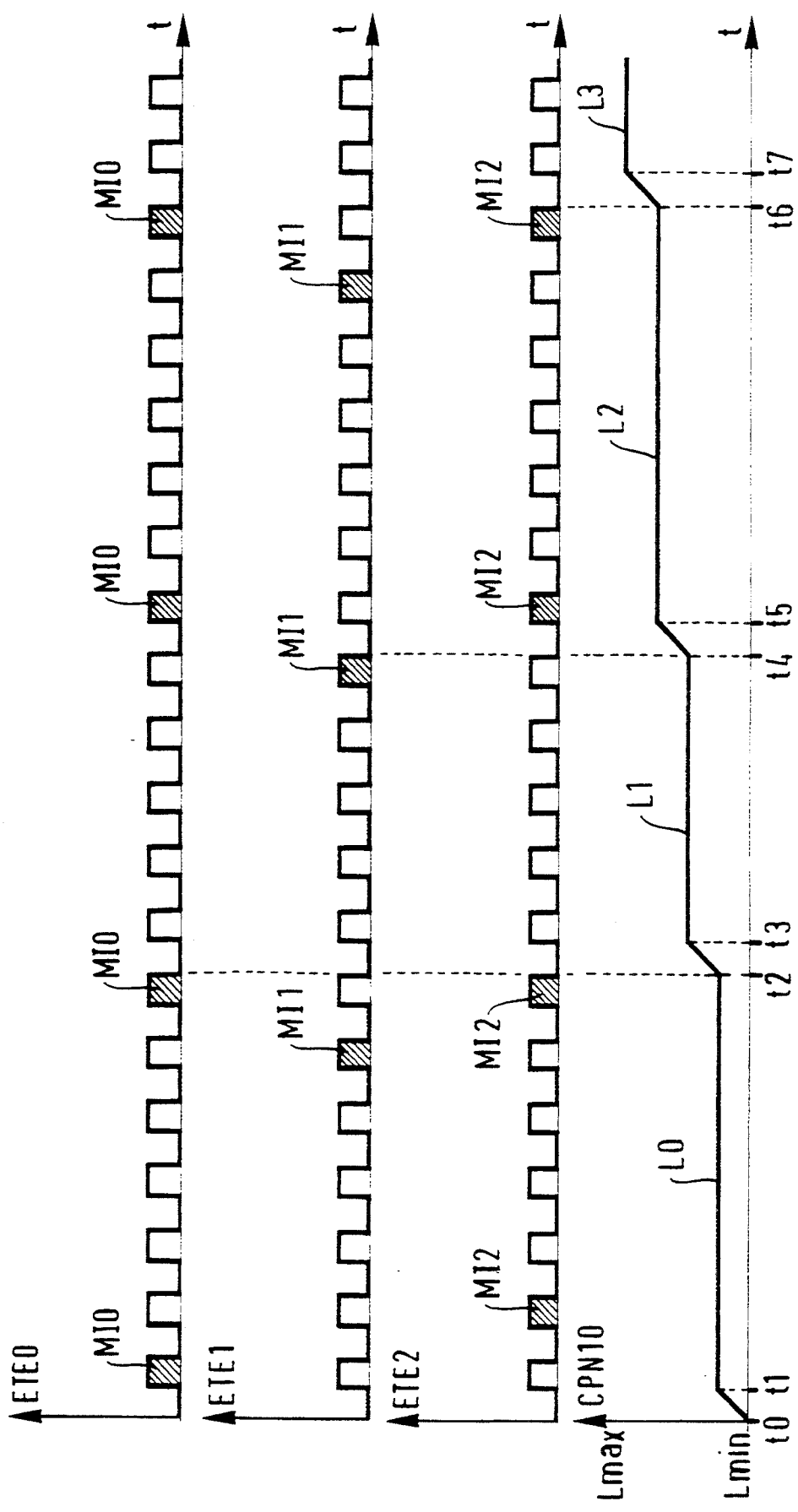
FIG. 2 shows timing diagrams illustrating the operation of this embodiment.

FIG. 2 shows the operation of the embodiment described above in respect of determining the system configuration. The first three timing diagrams show the cells sent by the respective central office termination equipments ETE0, ETE1, ETE2 taken by way of purely illustrative example. The final timing diagram shows the value of the wavelength to which the receiver of a customer premises network on standby (customer premises network CPN10, for example) is tuned. To determine the wavelength used by the central office termination equipments the receiver scans the entire range of wavelengths available to the central office termination equipments (Lmin through Lmax) continuously. Each central office termination equipment sends cells continuously. The cells are empty if the central office termination equipment has no data to send. Each central office termination equipment sends cyclically a cell containing an identification message: MI0, MI1, MI2 respectively for central office termination equipments ETE0, ETE1, ETE2.

The receiver starts at time t0 by tuning to the wavelength Lmin. At time t1 it receives a signal at wavelength L0. It tunes its filter to the wavelength L0 of the received signal and waits to detect an identification message at this wavelength. At time t2 it receives an identification message MI0 telling it that central office termination equipment ETE0 is sending and that this is a control central office termination equipment (in this example). The customer premises network memorizes the wavelength L0 by memorizing a filter tuning parameter value, the identity of the central office termination equipment ETE0 and a bit indicating that it is a control central office termination equipment. The receiver then resumes scanning the range of wavelengths.

At time t3 scanning is again halted because the receiver has detected a signal at wavelength L1. It waits for an identification message. It receives a message MI1 at time t4. It memorizes the wavelength L1, the central office termination equipment identity ETE1 and a bit indicating that it is not the control central office termination equipment. It then resumes scanning the range of wavelengths.

At time t5 the receiver stops scanning again because it receives a signal at wavelength L2. It waits for an identification message at this wavelength. It receives an identification message MI2 at time t6. It memorizes the wavelength L2, the central office termination equipment identity ETE2 and a bit indicating that it is not a control central office termination equipment. It then resumes scanning the range of wavelengths.

This scanning continues up to the maximal wavelength Lmax after which the receiver returns to standby at the control central office termination equipment wavelength L0.

Scanning is resumed subsequently, in a cyclic manner. It may be interrupted if the customer premises network is used, in order to set up a call, for example. The identification message waiting time is limited to a predetermined value: if the receiver does not detect any identification message within this time, it resumes scanning the range of wavelengths.

The number of customer premises networks connected to a group of central office termination equipments depends on the load on the group of central office termination equipments that the customer premises networks represent. Generally speaking, customer premises networks are not active simultaneously, i.e. they are not all communicating at the same time. Consequently, the number of central office termination equipments may be less than the number of customer premises networks. In a preferred embodiment, time-division multiplexing in the connection system in accordance with the invention enables the number of customer premises networks to be increased provided that each one has a bandwidth requirement which is substantially lower than the bandwidth provided by a central office termination equipment.

When a customer premises network is inactive its receiver is on standby at the control central office termination equipment wavelength. When a call is set up between a customer premises network and a central office termination equipment the optical sender and the optical receiver of the customer premises network are set to the wavelength of this central office termination equipment. For more efficient use of central office termination equipment bandwidth the same wavelength may be assigned to a plurality of customer premises networks or a plurality of simultaneous calls, by assigning it to each call during time slots separate from the time slots of other calls.

In FIG. 1, for example, the customer premises networks CPN0, CPN10, CPN20 are communicating with the central office termination equipment ETE31 at the same wavelength L31. The data exchanged between the customer premises networks and the central office termination equipments is all in the form of cells with a standardized asynchronous transfer mode format. To prevent mutual interference between the data sent by the three customer premises networks CPN0, CPN10, CPN20, the cells containing the data are sent during non-contiguous time slots, which may be repeated periodically to constitute a variety of time-division multiplexing superposed on the spectral multiplexing carried out by the optical distribution network.

Figure 3:
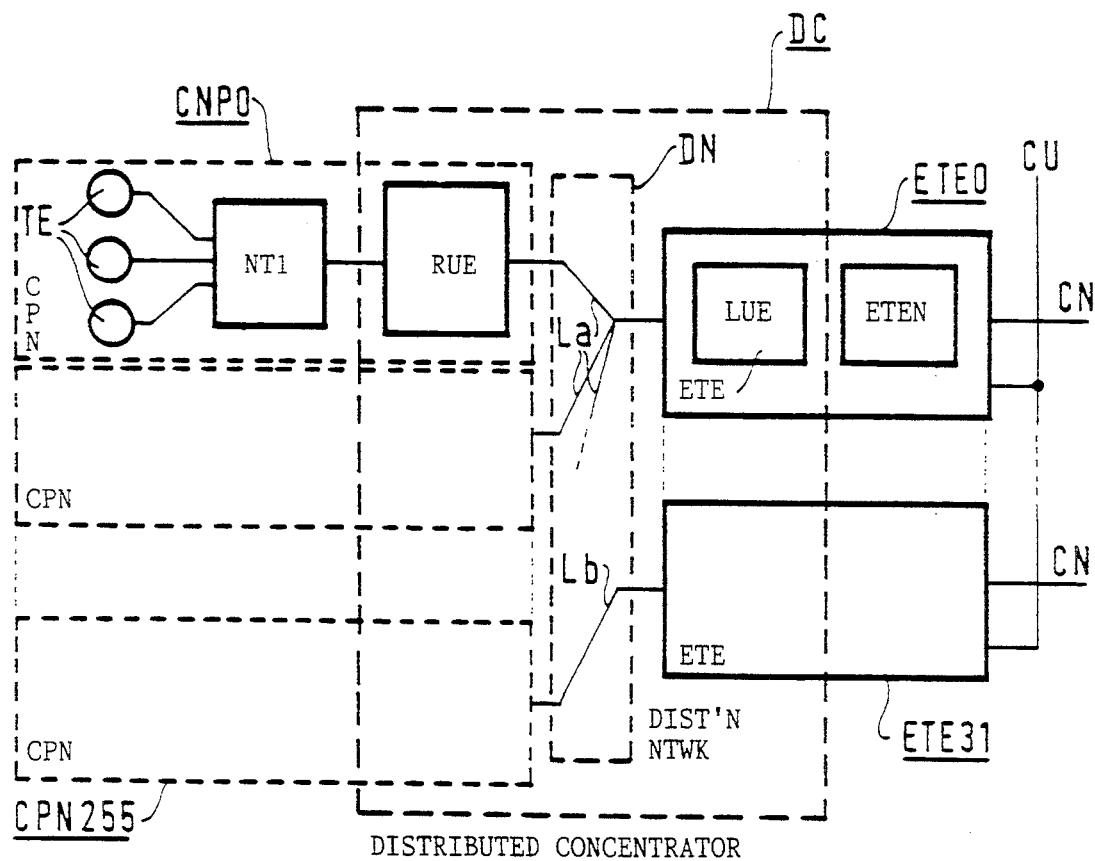
FIG. 3 is a functional block diagram of this embodiment.

FIG. 3 is a functional block diagram of this embodiment of a connection system in accordance with the invention. It shows the new functions as compared with those already provided in the system described in French patent application n° 91 12264. All the customer premises networks CPN0 through CPN255 may comprise identical functional units.

The customer premises network CPN0, for example, comprises: one or more terminal equipments TE such as telephones, videophones, fax machines, computers, TV sets, etc, a subscriber digital network termination NT1 as defined in CCITT Recommendation I.413 and a remote user equipment RUE. The remote user equipment RUE implements the known functions described in the patent application n° 91 12264 to assign a wavelength to the customer premises network CPN0 plus additional functions for time-division multiplexing consisting essentially in commanding the sending of data only during a time slot defined by the control unit CU and functions for memorizing the central office termination equipment identities and marking the control central office termination equipment.

All the central office termination equipments ETE0 through ETE31 comprise identical functional units. The central office termination equipment ETE0, for example, comprises: a central office termination equipment "nucleus" ETEN implementing the known subscriber connection functions and a local user equipment LUE which implements the functions described in the French patent application n° 91 12264 and essentially consisting in sending and receiving at a fixed wavelength and converting optical signals into electrical signals fed to the connection network and reciprocally converting electrical signals into optical signals fed to the distribution network DN, plus additional functions required by time-division multiplexing including regulating the throughput of data reconstituted by the central office termination equipment to the connection network CN and controlling time-division multiplexing and functions for sending cyclically a central office termination equipment identification message.

The throughput is regulated to prevent throughput peaks which compromise proper functioning of the connection network. Time-division multiplexing of data entails grouping cells in time slots respective to the various customer premises networks which send at the same wavelength. As the cells may be sent at different rates by each customer premises network and as time-division multiplexing sends the cells from each customer premises network in bursts, the central office termination equipment ETE0 receives cells at a rate which varies according to the time slot. In the absence of throughput regulation the throughput to the connection network CN would thus be subject to significant variations.

The remote user equipments RUE of the set of customer premises networks CPN0 through CPN255 and the local user equipments LUE of the set of central office termination equipments ETE0 through ETE31 constitute a distributed concentrator DC.

There are various ways for a call to be set up at the request of one of the customer premises networks CPN0 through CPN255. One way is for the control unit CU to have the control central office termination equipment send cyclically a series of interrogation messages respectively addressed to all inactive customer premises networks. A customer premises network requiring to set up a call responds immediately by sending a response message to the control central office termination equipment on its wavelength. An alternative method is for each customer premises network to be authorized to send a call request message to the control central office termination equipment on the latter's wavelength at periodic short time intervals. For this method to be used each customer premises network must be advised beforehand of: the time, the duration and the period of the time interval in which it is authorized to send. These parameters are supplied to the customer premises network at the end of each call, for example. The duration of the time interval may be very short because the call request message sent to the central office termination equipment can be restricted to a very small amount of data.

The requested call is then set up using a variety of time-division multiplexing with other calls already set up to optimize use of central office termination equipment bandwidth.

Figure 4:
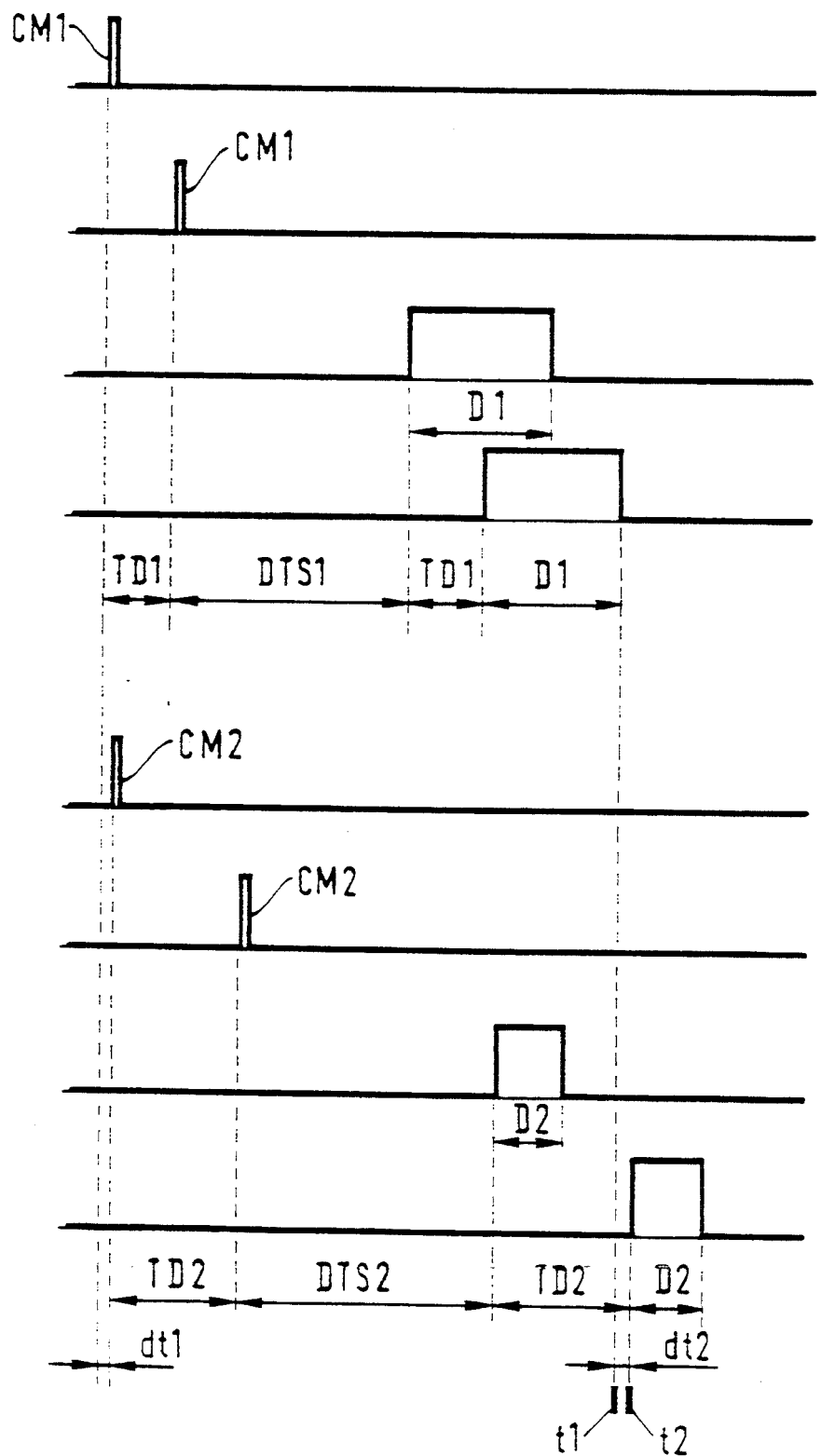
FIG. 4 shows timing diagrams illustrating the operation of this embodiment.

FIG. 4 shows eight timing diagrams illustrating the time-division multiplexing of data sent by two customer premises networks CPN1 and CPN2 which have set up two independent calls on the same wavelength using the same central office termination equipment ETEi. When the two calls are set up the control central office termination equipment ETEc sends a control message CM1 to the customer premises network CPN1 and then, after a time interval dt1, sends a control message CM2 to the customer premises network CPN2. These messages are shown on the first and fifth lines of FIG. 3, respectively. The second and sixth lines of FIG. 3 respectively show the reception of the messages CM1 and CM2 by the customer premises networks CPN1 and CPN2. The third and seventh lines of FIG. 3 respectively show the sending of data by the customer premises networks CPN1 and CPN2. The fourth and eighth lines of FIG. 3 respectively show reception by the central office termination equipment ETE of the information sent by the customer premises networks CPN1 and CPN2.

The message CM1 is received by the customer premises network CPN1 after a time-delay TD1. The message CM2 is received by the customer premises network CPN2 after a time-delay TD2 which is different than TD1 because the two customer premises networks are at different distances from the switching center EX. The message CM1 tells the customer premises network CPN1 that it is authorized to send after a delay time for sending DTS1 starting with receipt of the message CM1 and for a duration D1. The message CM2 tells the customer premises network CPN2 that it is authorized to send after a delay time for sending DTS2 starting from receipt of the message CM2 and for a duration D2.

The control unit CU of the switching center EX knows the time-delays TD1 and TD2 either because these were measured when the customer premises networks CPN1 and CPN2 were created or because they are measured periodically by means of a test message. The control unit CU calculates the delay times DTS1 and DTS2 on the basis of the time-delays TD1 and TD2 and the duration dt1 of the time interval between sending of the messages CM1 and CM2. For example, the control unit CU notes first that the time-delay TD1 is shorter than the time-delay TD2 and so decides to choose a delay time DTS1 shorter than the delay time DTS2. The delay time DTS1 is chosen at random except that its value must be greater than the time needed for a customer premises network to receive the message CM1 completely and interpret it. The duration D1 is chosen according to the bandwidth required for the customer premises network CPN1. In this example it is assumed to be twice that required for the customer premises network CPN2 which is why the duration D1 is twice the send duration D2.

The control unit CU deduces the time t1 at which reception by the central office termination equipment ETEi of the data sent by the customer premises network CPN1 ends. It adds to time t1 a duration dt2 as a safety margin, yielding the time t2 at which reception by the central office termination equipment ETEi of the data sent by the customer premises network CPN2 should begin. The control unit CU then deduces the delay time DTS2 knowing the time-delay TD2 and the duration dt1 of the time interval between sending of the message CM1 and sending of the message CM2.

There is strictly speaking no synchronization between the clocks of the various customer premises networks and those of the central office termination equipments. These clocks are merely plesiochronous. Each customer premises network uses the time it receives a control message as a reference to start measuring the duration of the delay time assigned to it.

In another preferred embodiment ETEi sends a synchronization message periodically to all CPNj. Each CPNj synchronizes its own clock to the time it receives the synchronization message. The send delay times DTSj are measured from reception of the sychronization message. In this alternative embodiment the same messages CM1 and CM2 are used to convey respective data DTS1, D1 and DTS2, D2; however, the send times are determined from receipt of the synchronization message. This enables the messages CM1 and CM2 to be sent without consideration as to the time interval dt1.

Taking the time at which the synchronization message is sent as the time origin, the data sent by a customer premises network CPNj is received in ETEi between times:

$$2TDj + DTSj$$

and $$2TDj + DTSj + Dj$$

The synchronization message may also be used for other purposes. It may include the identifier of the central office termination equipment ETEi and an indication as to whether it is the control central office termination equipment or not. It may command a particular CPNj to respond with a predetermined message telling it DTSj. The time at which this message is received at ETEi enables TDj to be measured.

In one embodiment the central office termination equipment must send a control message CM for each sending by a customer premises network. In another embodiment a control message authorizes a customer premises network to send data periodically, the period being also indicated in the message or determined once and for all for a given type customer premises network. This periodic sending may be stopped by a decision of the customer premises network or by a decision of the control unit of the switching center, the latter sending a particular control message to the customer premises network concerned via the central office termination equipment used for the current call.

Figure 5:
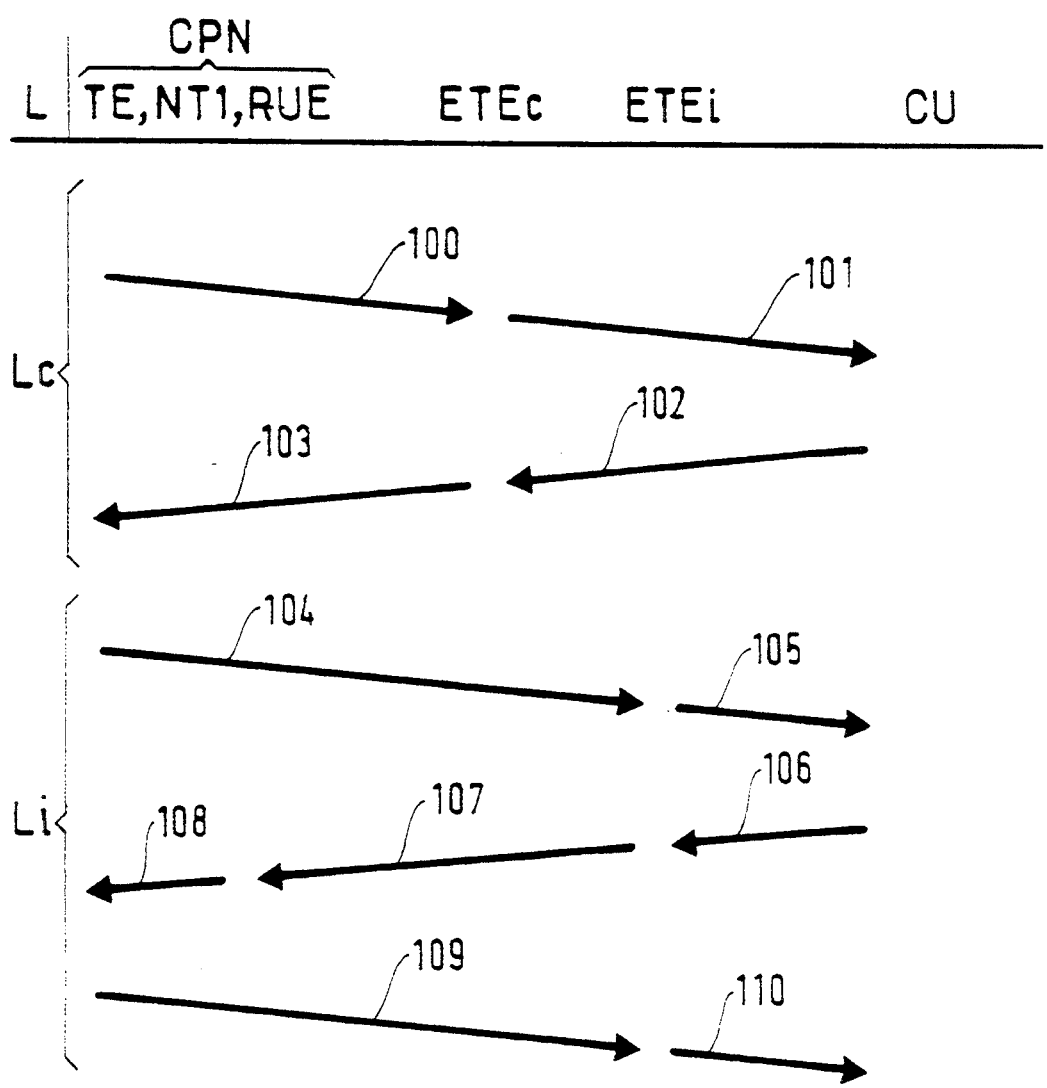
FIG. 5 shows the main stages of call set-up in this embodiment.

FIG. 5 shows the exchange of data between a customer premises network CPN, a control central office termination equipment ETEc, a central office termination equipment ETEi in communication with the customer premises network CPN and the control unit CU of the switching center. The control central office termination equipment ETEc is identical to the other central office termination equipments but is used by the customer premises networks as their interlocuter for setting up calls. Each customer premises network has a table showing the relationship between the respective wavelengths and the respective identities of the various central office termination equipments of the connection system, including the wavelength of the control central office termination equipment ETEc. When a customer premises network is inactive its optical receiver is tuned systematically to the control central office termination equipment wavelength. There are two possible situations:

The customer premises network CPN requests call set-up: it sends a message to the control central office termination equipment ETEc on the latter's wavelength either after an interrogation message sent cyclically by the control central office termination equipment or in a time interval reserved to the customer premises network, i.e. by one of the two methods previously described. The control central office termination equipment ETEc receives this message and sends it to the control unit CU of the switching center. The control unit CU sends a message to the customer premises network CPN via the control central office termination equipment ETEc. This message includes the identity of an available central office termination equipment ETEi, the control unit CU knowing the status of each central office termination equipment by virtue of its connection over the B link. The customer premises network CPN then tunes its optical sender and its optical receiver to the wavelength of the central office termination equipment ETEi assigned to it.

Call set-up is requested by a network subscriber who wishes to call a customer premises network served by the optical connection system. If the customer premises network is not already in communication the control unit CU commands the control central office termination equipment ETEc to send the identity of an available central office termination equipment ETEi to the called customer premises network CPN. The customer premises network receives this message and tunes its optical sender and its optical receiver to the wavelength of the central office termination equipment ETEi assigned to it. If the customer premises network CPN is already in communication with another central office termination equipment the control unit CU uses this other central office termination equipment to dialog with the customer premises network.

Calls are of three types: broadcast from a central office termination equipment to a plurality of customer premises networks with no transmission in the opposite direction, broadcast from a central office termination equipment to a plurality of customer premises networks with transmission in the reverse direction, and point-to-point transmission from one central office termination equipment to one customer premises network and vice versa.

The connection system is particularly well suited to broadcast type calls because any optical signal sent by a central office termination equipment is systematically routed to all customer premises networks connected to the same broadcast network. The optical receivers of the customer premises networks receiving a broadcast merely need to be tuned to the wavelength of the central office termination equipment broadcasting the call. On the other hand, in this type of connection system point-to-point calls must be encyphered to prevent customer premises networks discovering the content of calls that are not addressed to them. Irrespective of the call type, the data exchanged between the customer premises networks and the central office termination equipments is in the form of cells to a standardized asynchronous format. This format comprises a virtual circuit identifier field and a virtual circuit group identifier field which together identify each call. The equipment ETEN of the central office termination equipment ETEi assigns a value to these fields for each call and the remote user equipment RUE of the customer premises network CPN recognizes this value for each call.

Encyphering may be carried out as follows: a coding law is chosen by the local user equipment LUE of the customer premises network CPN and is then sent in a protected form to the local user equipment LUE of the central office termination equipment ETEi assigned to the call. Coding and decoding are thus carried out using the same law in the central office termination equipment and the customer premises network communicating with each other.

Another encyphering method is to allocate a fixed encyphering law for each customer premises network and to tell each connection system central office termination equipment the encyphering law of each customer premises network of the system. This simplifies the exchange of signalling messages between the customer premises network and the central office termination equipment but means that each customer premises network must be initialized with a predetermined encyphering law.

Consider the main message sent by the local user equipment LUE of a central office termination equipment to the remote user equipment RUE of one or more customer premises networks CPN:

a message, as already indicated, is used by the control central office termination equipment ETEc to tell each customer premises network the time and the duration of the time interval in which it is authorized to send data, a message is sent by each central office termination equipment periodically or pseudo-periodically to indicate the identity of the central office termination equipment in order to maintain in the remote user equipment RUE of each customer premises network CPN an up-to-date table showing the relationship between each wavelength that the customer premises network may receive and the identities of the central office termination equipments which are actually accessible to that customer premises network, and a message is sent by the central office termination equipment (the control central office termination equipment ETEc for example) to command a customer premises network to discard the wavelength to which it is tuned and to tune to another wavelength as indicated by the message.

Some of these message are sent in clear and can be received and processed by all the remote user equipments RUE of all the customer premises networks.

Consider the messages sent from a customer premises network CPN to a central office termination equipment. These messages are usually conventional signalling messages generated by a terminal T1 but there are at least two specific messages generated by the remote user equipment RUE:

a message to indicate the encyphering law to be used, when setting up a call; this message is sent to the central office termination equipment ETEi used for a call after the control central office termination equipment ETEc has commanded the customer premises network to tune to a wavelength of a central office termination equipment ETEi other than the control central office termination equipment ETEc, and a message sent to the control central office termination equipment ETEc to indicate that the customer premises network requires to access a broadcast service whose identity is specified in the message.

Figure 6:
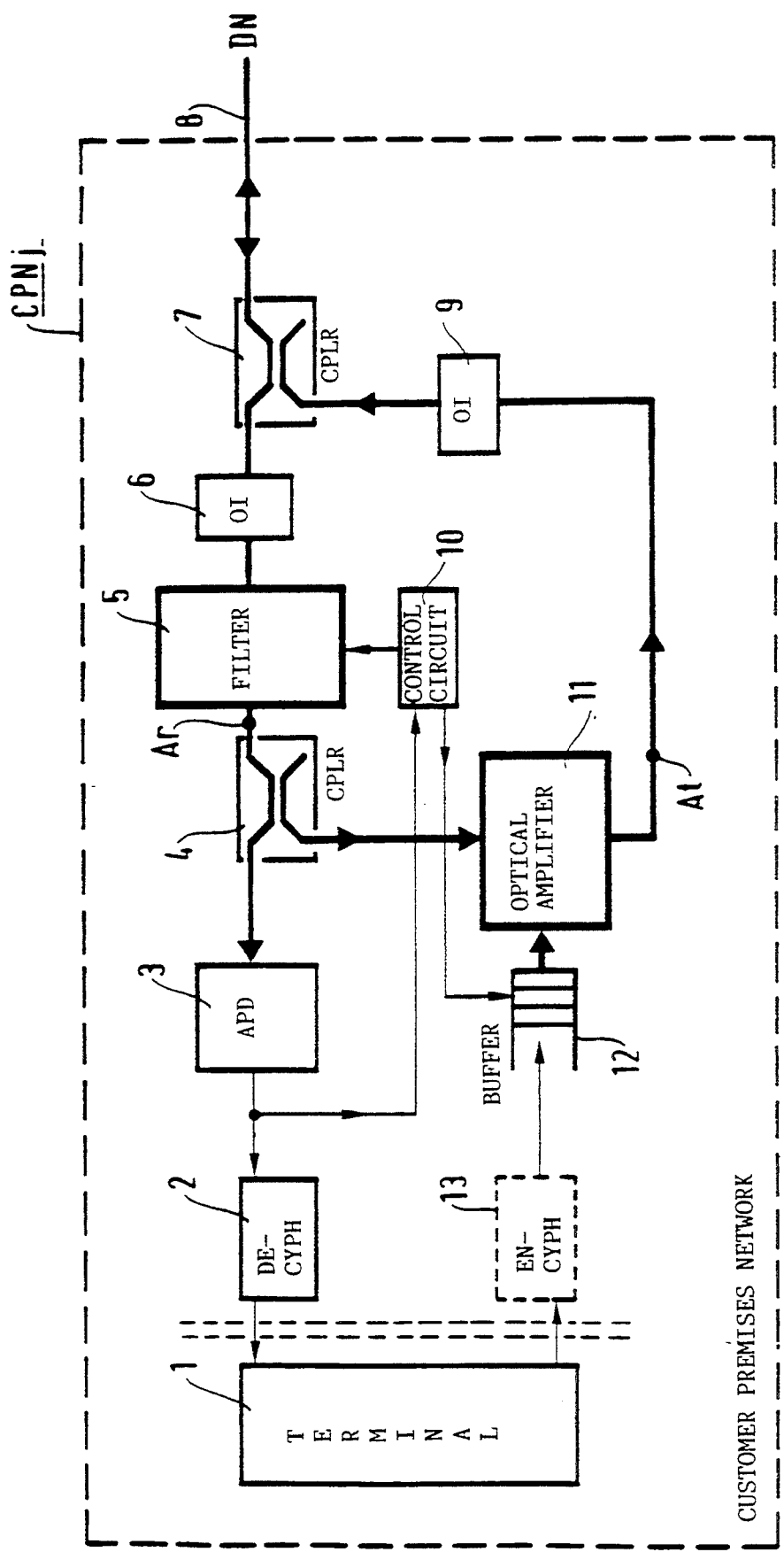
FIG. 6 is the block diagram of one embodiment of a customer premises network.

FIG. 6 shows the setting up of a point-to-point call or a point-to-point call combined with broadcasting. Call set-up begins with a request message 100 sent by the terminal equipment TE and passed on to the control central office termination equipment ETEc by the remote user equipment RUE on the wavelength Lc of the control central office termination equipment. The latter sends the message (step 101) to the control unit CU of the switching center EX. The latter responds to the control central office termination equipment ETEc (step 102) with a message giving the identity of another central office termination equipment ETEi selected from the central office termination equipments available at the time in question, the delay time for sending DTS which defines the time at which sending is authorized and the duration D for which sending is authorized. The control central office termination equipment ETEc then sends a message to the customer premises network (step 103). The latter tunes its optical receiver and its optical sender to the wavelength Li of the central office termination equipment ETEi.

This data is stored in the remote user equipment RUE and the remainder of the message is sent to the terminal equipment TE. The terminal equipment responds with an acknowledge message (step 104). The remote user equipment RUE adds to this acknowledge message an indication defining the encyphering law to be used for this point-to-point call. The message is received by the central office termination equipment ETEi and then sent to the control unit CU (step 105). The control unit CU authorizes the central office termination equipment ETEi to set up the call, carrying out the encyphering defined by this law (step 106). The central office termination equipment ETEi sends the encyphered data to the customer premises network CPN (step 107). The remote user equipment RUE decyphers the data and sends it to the terminal equipment TE (step 108). The customer premises network CPN recognizes that the message is addressed to it by recognizing the value of the virtual circuit identifier and virtual circuit group identifier fields which contain particular values stored in tables at the terminal equipment TE.

The terminal equipment TE sends data to the addressee subscriber and signalling data (step 109). The signalling data is sent to the control unit CU by the central office termination equipment ETEi (step 110). The data addressed to the called telecommunication network subscriber is sent to that subscriber via the connection network CN.

FIGS. 6 and 7 are respectively block diagrams of one embodiment of part of the customer premises network CPNj and one embodiment of the local user equipment LUEi of a central office termination equipment ETEi providing two-way communication on a single optical fiber and requiring only one tunable laser. The tunable laser is in the central office termination equipment ETEi and provides a carrier for both transmission directions. The customer premises network CPNj comprises:
- a terminal 1 such as a telephone (intermediate equipments between the terminal 1 and the other equipments listed below are not shown),
- a device 2 for decyphering data addressed to terminal 1 (optional),
- a device 13 for encyphering data from the terminal 1,
- a photodetector 3 such as an avalanche photodiode,
- two couplers 4 and 7,
- two optical isolators 6 and 9,
- an optical filter 5 tunable by an electrical signal supplied to a control input,
- a control circuit 10,
- an optical amplifier 11 whose gain is controlled by an electrical signal applied to a control input, and
- an electronic buffer memory 12.

The customer premises network CPNj is connected to the distribution network DN by a single optical fiber 8 used for transmission in both directions. The optical signal arriving on the fiber 8 passes through the coupler 7, the isolator 6, the filter 5 and the coupler 4 and then is converted into an electrical signal by the photodetector 3. Part of the optical signal is sampled by the coupler 4, amplified by the amplifier 11, passes through the isolator 9 and is injected back into the fiber 8 by the coupler 7 to be conveyed towards the switching center. The photodetector 3 has an electrical output connected to an input of the decyphering circuit 2 and to an input of the control circuit 10. The encyphering circuit 13 has an output connected to an input of the buffer memory 12. A control input of the buffer memory 12 is connected to an output of the control circuit 10. The control input of the optical amplifier 11 is connected to an output of the buffer memory 12. The control input of the filter 5 is connected to an output of the control circuit 10.

As the signalling data is not encyphered it is sampled at the output of the photodetector 3 so that it can be supplied to the control circuit 10. The other data is encyphered, however, and requires decyphering in the device 2. The data sent by the terminal 1 may be encyphered by the encyphering device 13 and then stored in the buffer memory 12 pending authorization for it to be sent. The control circuit 10 controls the writing and reading of this data in the buffer memory 12. The data read in the buffer memory 12 is used to modulate the gain of the amplifier 11 in a binary fashion. The amplifier 11 modulates the amplitude of the fraction of the optical signal obtained by the coupler 4 and this avoids the need for a tunable laser in each customer premises network.

Another function of the control circuit 10 is to tune the filter 5. When the customer premises network CPNi is created, and periodically thereafter while it is inactive:
- it tunes the filter 5 successively to each of the 32 wavelengths available to the central office termination equipments,
- at each wavelength it waits for a predetermined time to receive an identification message,
- if it receives an identification message during this time it memorizes the central office termination equipment identity contained in the identification message with a flag bit indicating if it is a control central office termination equipment or not,
- if it does not receive any identification message it memorizes a binary word indicating that no central office termination equipment is operating at this wavelength, and
- when all 32 wavelengths have been scanned, it looks up in memory the wavelength of a control central office termination equipment and tunes the filter 5 to this wavelength, on which it remains on standby for a predetermined time at the end of which it starts scanning the 32 wavelengths again.

When a call is being set up, at the request of a network subscriber, the control circuit 10 receives on the control central office termination equipment wavelength a message telling it the identity of a central office termination equipment to which the call is assigned. It then tunes the filter 5 to this wavelength and acknowledges reception, as described already with reference to FIG. 5.

Each inactive central office termination equipment sends cells continuously. If it has no data to send it sends empty cells having a predetermined format. The control circuit 10 includes a clock slaved by a known method to the clock rate of the cells it receives, whether empty or not. The presence of empty cells at a particular wavelength tells the customer premises networks that a central office termination equipment is present on this wavelength. The control circuit 10 further comprises a known type control device which slaves the filter at all times to the wavelength of the received cells.

FIG. 7 is a block diagram of one embodiment of the local user equipment LUEi of a central office termination equipment ETEi which comprises:
- a coupler 21,
- an optical isolator 22,
- a laser 23 tuned to a fixed wavelength which is different for each central office termination equipment ETE,
- an encyphering device 24,
- a decyphering device 25 (optional),
- a photodetector 26 such as an avalanche photodiode, for example,
- an optical filter 27 tuned to a fixed wavelength which is different for each central office termination equipment ETE,
- a control circuit 28 connected by the link B to the control unit CU of the switching center, and
- a buffer memory 29.

The central office termination equipment ETEi is connected to the distribution network DN by a single optical fiber 20 used for transmission in both directions. The optical fiber 20 is connected to a port of the coupler 21. Two other ports of the coupler 21 are respectively connected to an output of the optical isolator 22 and to an input of the filter 27. The coupler 21 sends to the fiber 20 an optical signal supplied by the isolator 22 and addressed to the distribution network DN. The coupler 21 samples an optical signal from the distribution network DN and applies it to the input of the filter 27 which has an output connected to an input of the photodetector 26.

An electrical output of the photodetector 26 is connected to an input of the control circuit 28 and to an input of the decyphering circuit 25. An output of the circuit 25 is connected to an input of the buffer memory 29. An output of the buffer memory 29 is connected to an input of the connection network CN via the equipment ETENi. A control input of the buffer memory 29 is connected to an output of the control circuit 28.

One output of the connection network CN is connected via the equipment ETENi to an input of the encyphering circuit 24. An output of the circuit 24 is connected to an amplitude control input of the laser 23. An output of the control circuit 28 is connected to another amplitude control input of the laser 23.

FIGS. 8 and 9 illustrate the operation of the customer premises network CPNi and the central office termination equipment ETEj when they are in communication. FIG. 8 shows the amplitude Ar as a function of time t of the optical signal at the output of the filter 5, i.e. the optical signal propagating from the central office termination equipment to the customer premises network. FIG. 8 shows the amplitude At as a function of time t of the optical signal at the output of the amplifier 11 which is used as a modulator, i.e. the amplitude of the optical signal propagating from the customer premises network to the central office termination equipment. The reference symbols Ar and At are repeated in FIG. 6 to show where these amplitudes exist.

The amplitude Ar varies between a high level Ph and a low level Pb which is a long way a way from the zero amplitude in order to supply to the customer premises network an optical signal of sufficient energy to enable the transmission of a return signal. The logic levels are detected at the output of the photodetector 3 by comparing the amplitude of the electrical signal supplied by the photodetector 3 with a threshold value sd2 equal to half the sum of the values Ph and Pb.

The amplifier modulates the amplitude of the signal supplied by the coupler 4 and comprising a fixed fraction (one half, for example) of the signal applied to the input of the coupler 4 and shown in FIG. 8. The amplifier modulates this signal between a minimal value P0 which is close to zero and a maximal value which is equal to the amplitude Pb or Ph, depending on the signal supplied to the amplifier at the time in question. In the central office termination equipment ETEj the coupler 21 extracts this signal and applies it to the photodetector 26. A logic level at the output of the detector 26 is detected by comparing the amplitude of the electrical signal supplied by the detector 26 with a threshold value sd1 equal to half the sum of the values P0 and Pb.

The bit rate need not be the same in both directions. It may be 600 Mbit/s in the direction from the central office termination equipment to the customer premises network and 150 Mbit/s in the direction from the customer premises network to the central office termination equipment, for example.

In the customer premises network CPNi the buffer memory 12 stores data to be sent until sending is authorized. The data is supplied at a constant rate by the terminal 1 in the form of cells having the standardized asynchronous transfer mode format. The function of the buffer memory 29 in the central office termination equipment ETEj is to regularize the throughput of this data before it is sent to the connection network CN because each input of an asynchronous transfer mode connection network is designed for a particular maximal bit rate. This maximal rate must not be exceeded. Also, fewer cells are lost in the connection network if the network input bit rates are regular.

The control circuit includes, for example, switches for assigning an identity number to the central office termination equipment. It further comprises a processor which has a program for:
- Sending a central office termination equipment identification message cyclically using the laser 23. This message contains the central office termination equipment identity number and a bit indicating whether it is a control central office termination equipment or not.
- Sending the messages previously mentioned for implementing the control central office termination equipment function or the call central office termination equipment function, as appropriate.

FIG. 10 is the block diagram of a preferred embodiment of the distribution network DN for connecting a switching center EX' to customer premises networks CPN0' through CPN255'. This embodiment has the advantage of maintaining service even if failure of the distribution network DN cuts off half the transmission channels in the distribution network DN.

The switching center EX' comprises, for example, 32 central office termination equipments ETE0' through ETE31' and two optical couplers 40 and 41 each having 16 ports respectively connected to 16 outputs of the central office termination equipments ETE0' through ETE31' and four ports respectively connected to four optical fibers of the distribution network DN. Four fibers of which two are connected to the coupler 40 and two are connected to the coupler 41 constitute a cable 35. The other four fibers connected to these couplers constitute a cable 36 routed differently than the cable 35. If either cable is damaged accidentally the other cable is not affected.

Near the customer premises networks CPN1' through CPN255' the distribution network DN further comprises four optical couplers 31 through 34 each having two ports connected to two fibers of the distribution network DN and 64 ports respectively connected to 64 customer premises networks CPN1' through CPN255'. The coupler 34 has two ports respectively connected to two ports of the coupler 41 by two fibers a and b of the respective cables 36 and 35, for example. If cable 35 is broken the coupler 34 is still connected to the coupler 41 by fiber a of cable 36. Consequently, the 64 customer premises networks connected to the coupler 34 are still able to access 16 of the central office termination equipments ETE0' through ETE31' so that a considerable part of the service can still be provided. If some subscribers are unable to reach the control central office termination equipment the control central office termination equipment function can be assigned to a second central office termination equipment.

Many variants of this embodiment will suggest themselves to the man skilled in the art, retaining the general principle of transmission by two independent cables 35 and 36 to the same coupler. The number of optical couplers used and the number of ports which each optical coupler comprises depend on energy considerations: optical receiver sensitivity, optical sender power output, and the presence or absence of optical amplifiers in the distribution network DN.

The invention is not limited to the customer premises network and central office termination equipment embodiments shown in FIGS. 5 and 6. Any bidirectional transmission system using the same wavelength and the same optical fiber may be adapted to implement the invention. In particular, modulation processes other than amplitude modulation may be used.

Each central office termination equipment has a fixed wavelength, but the central office termination equipments may comprise a tunable optical sender to render the central office termination equipments readily interchangeable. The optical sender is then tuned to a fixed wavelength when the system is installed.

There is claimed:

1. An automatically configurable optical connection system, comprising:
    a switching center comprising: a connection network, a plurality of central office termination equipments, each of the central office termination equipments coupled to the connection network, and a connection network control unit coupled to the connection network and coupled to each of the central office termination equipments, each of the central office termination equipments operating at a fixed wavelength which is different for each of the central office termination equipments, each of the central office termination equipments including an optical sender and an optical receiver which are tuned to the fixed wavelength, at least one of the central office termination equipments being assigned by the control unit to be a control central office termination equipment;
    a plurality of customer premises networks, each of the customer premises networks comprising an optical sender and an optical receiver tuned to an assigned wavelength which is variable, the assigned wavelength being set to the fixed wavelength of the control central office termination equipment when the customer premises network is not communicating; and
    an optical distribution network connecting the optical sender of each of the central office termination equipments to the optical receiver of each of the customer premises networks, and connecting the optical sender of each of the customer premises networks to the optical receiver of each of the central office termination equipments,
    the control unit assigning different wavelengths to each of the customer premises networks communicating at a given time, the different wavelengths corresponding to available central office termination equipments which are not the control central office termination equipment,
    each of the central office termination equipments having a unique identity indicator and further comprising means for commanding the optical sender to send cyclically an identification message to the optical distribution network, the message containing the unique identity indicator of the central office termination equipment and indicating whether the central office termination equipment has been assigned to be the control central office termination equipment,
    each of the customer premises network further comprising means for, when the customer premises network is inactive:
    tuning the receiver of the customer premises network successively to the wavelength of each of the central office termination equipments;
    waiting at each wavelength for a predetermined period of time to receive the identification message;
    memorizing a central office termination equipment identity for each wavelength on which the customer premises network has received the identification message;
    marking the identity of the control central office termination equipment among the memorized identities; and
    tuning the receiver of the customer premises network to the wavelength of the control central office termination equipment.

2. System according to claim 1, wherein said switching center further comprises means for:
    assigning a control central office termination equipment function to at least one of the central office termination equipments that is operating correctly,
    monitoring operation of each central office termination equipment, and
    assigning the control central office termination equipment function to a different central office termination equipment that is operating correctly if a previous control central office termination equipment fails.

3. System according to claim 1 wherein said optical distribution network comprises:
    at least a first stage of optical couplers connected to said central office termination equipments,
    at least a second stage of optical couplers connected to said customer premises networks, and
    fibers connecting said first stage couplers to said second stage couplers, at least two optical fibers linking each second stage coupler to at least one first stage coupler, using different paths, so that failure of either optical fiber does not prevent any customer premises network from being connected to at least one central office termination equipment.

* * * * *